United States Patent [19]

Keever et al.

[11] 3,810,683

[45] May 14, 1974

[54] TEMPERATURE COMPENSATED MAGNETIC BEARING ASSEMBLY FOR AN INDUCTION METER

[75] Inventors: Joseph M. Keever, Raleigh; William J. Zisa, Cary, both of N.C.

[73] Assignee: Westinghouse Electric Corporation, Pittsburgh, Pa.

[22] Filed: Dec. 21, 1972

[21] Appl. No.: 317,331

[52] U.S. Cl. ............................................... 308/10
[51] Int. Cl. .................................... F16c 39/06
[58] Field of Search .............. 308/10; 324/137, 155

[56] References Cited
UNITED STATES PATENTS

| | | | |
|---|---|---|---|
| 3,107,948 | 10/1963 | Lovegrove | 308/10 |
| 3,582,162 | 6/1971 | Baerman | 308/10 |
| 3,657,676 | 4/1972 | Milligan | 308/10 |
| 2,869,934 | 1/1959 | Milligan | 308/10 |
| 3,434,084 | 3/1969 | Milligan | 308/10 |
| 3,597,023 | 8/1971 | Baerman | 308/10 |
| 3,370,896 | 2/1968 | Atkins | 308/10 |
| 3,143,704 | 8/1964 | Wright | 324/155 |

Primary Examiner—R. Skudy
Attorney, Agent, or Firm—R. W. Smith

[57] ABSTRACT

A temperature compensated magnetic bearing assembly for an induction meter includes upper and lower permanent magnets including both series and shunt temperature compensating magnetic flux paths. The magnetic fluxes in the shunt and series paths produce opposing compensating effects with temperature variations to maintain a constant support gap between the permanent magnets throughout an extended temperature range.

5 Claims, 5 Drawing Figures

PATENTED MAY 14 1974 3,810,683

PRIOR ART FIG.4

TEMPERATURE COMPENSATED MAGNETIC BEARING ASSEMBLY FOR AN INDUCTION METER

CROSS REFERENCES TO RELATED PATENTS

This invention is related to U.S. Pat. No. 3,143,704 issued Aug. 4, 1964 to D. F. Wright and U.S. Pat. No. 3,309,152 issued Mar. 14, 1967 to J. E. Ramsey et al. and both are assigned to the assignee of this invention.

BACKGROUND OF THE INVENTION

The field of this invention relates to temperature compensated magnetic bearing assemblies in induction meters for supporting a rotor for rotation about a vertical axis and more particularly to an improved magnetic bearing assembly having at least two temperature compensating magnetic flux paths which are oppositely coacting with temperature changes to maintain a predetermined support gap spacing between the rotor and stator parts.

Magnetic bearing assemblies are well known for supporting a rotor in an induction meter of the type including watthour meters. The rotor is rotatably oriented along a vertical axis by the bearing assembly so as to be maintained with a predetermined support gap relative to an electromagnet portion of the meter stator. Generally, these bearing assemblies include a stationary permanent magnet oriented to produce either repulsion or attraction magnetic forces to support the rotor through a gap at the desired vertical position. The permanent magnet materials often include reversible magnetic strength characteristics which change with temperature. Since the induction meters are required to operate in widely varying ambient temperature conditions, it is necessary to compensate for these changes in magnetic strength characteristics.

It has been previously suggested to utilize a shunt temperature compensating member having a negative temperature coefficient of permeability. This negative magnetic temperature characteristic of a shunt compensating member is used to divert the permanent magnet pole flux by decreased amounts as the temperature increases. Typically, magnetic materials having a negative temperature coefficient of permeability are expensive and, more importantly, have the disadvantage that a larger permanent magnet is required to produce the additional magnetic flux which is diverted through the shunt compensating member. Accordingly, the permanent magnets required are larger, have more weight and can add difficulty in adding to the otherwise compact design features typically found in induction watthour meters.

In U.S. Pat. Nos. 3,143,704 issued Aug. 4, 1964 to D. F. Wright and 3,309,152 issued Mar. 14, 1967 to Ramsey et al., both assigned to the assignee of this invention, a series temperature compensating arrangement is provided by soft magnetic cups which form magnetic pole pieces for cylindrical permanent magnets supported within the cups. Magnetic return paths for permanent magnet pole fluxes are formed through these magnetic cups. These soft magnetic cups are also effective to substantially decrease the leakage fluxes and to produce a more uniform flux pattern at the pole faces. This produces a maximum magnetic support producing interaction between the magnetic fluxes of the facing permanent magnet poles. The bearing assembly described in the aforementioned patents has been found highly successful under most generally accepted ambient temperature operating ranges. However, when operation is required under more extended and elevated temperature ranges or when more precise control of the bearing support gap spacing is desired it was found by the present invention that a shunt temperature compensating arrangement may be utilized to cooperatively coact with the series temperature compensating arrangement provided by the cup pole pieces without substantially increasing the previously considered disadvantageous use of such shunt temperature compensating arrangements.

BRIEF DESCRIPTION OF THE INVENTION

In accordance with this invention, a temperature compensated magnetic bearing assembly for an induction meter includes upper and lower permanent magnets having annular pole faces that are supported in soft magnetic cups in coaxial alignment for establishing and controlling a support gap therebetween. A temperature compensating magnetic sleeve is positioned within an inner diameter of the lower permanent magnet and extends between the opposite pole face ends to form a shunt magnetic path therebetween. The magnetic sleeve material has a magnetic temperature characteristic which is opposite from the magnetic temperature characteristic of the cup material included in a series magnetic flux path between the pole faces of the permanent magnets supported in the magnetic cups. The magnetic fluxes in the series magnetic paths of the upper and lower permanent magnets and the magnetic flux of the shunt magnetic path of the lower permanent magnet are varied with temperature changes so as to maintain an improved substantially constant support gap between the permanent magnets.

It is a general object of this invention to provide an improved temperature compensated bearing assembly of the repulsion type for induction meters wherein both series and shunt temperature compensating flux paths are provided for maintaining a constant support gap space between concentrically aligned permanent magnets. It is a further object of this invention to provide a temperature compensating magnetic sleeve having a unique configuration and position by extending along the inner diameter of one of a pair of permanent magnets having annular pole face ends with the permanent magnets being mounted in soft magnetic cups such that the cups define series flux paths for shaping and compensating for temperature variation in the interacting magnetic fluxes between the permanent magnets and wherein the compensating sleeve defines a shunt flux path for diverting a controlled portion of magnetic flux from the associated permanent magnet and for controlling desired reorientation of the pole flux so as to provide further compensation with temperature variation and improved support gap variations throughout extended ranges of temperature variations.

BRIEF DESCRIPTION OF THE DRAWING

FIG. 4 is a graph illustrating relative changes in the bearing support gap with temperature variations with and without the use of a compensating sleeve included in the magnetic bearing assembly of this invention.

DESCRIPTION OF THE PREFERRED EMBODIMENT

Figure 1:
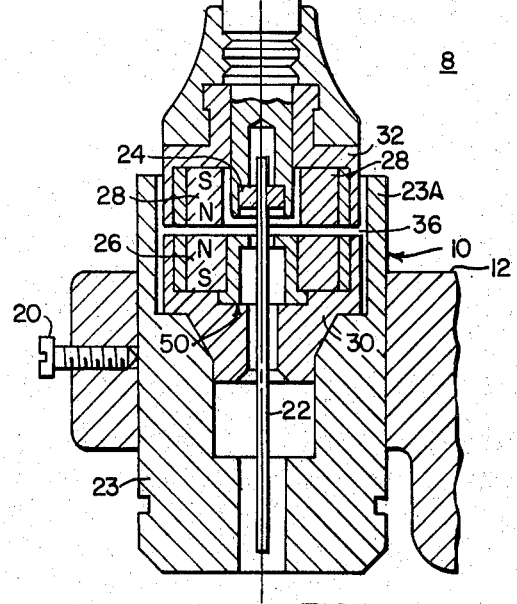
FIG. 1 is a side elevational view with parts broken away of an induction meter having a magnetic bearing assembly made in accordance with this invention.

Referring now to the drawing, and more particularly to FIG. 1, there is shown an alternating current watthour meter 8 of the induction meter type and includes a magnetic bearing assembly 10 which is an improvement of the bearing assembly described and claimed in U.S. Pat. No. 3,143,704 issued Aug. 4, 1964 to D. F. Wright and U.S. Pat. No. 3,309,152 issued Aug. 9, 1963 to J. E. Ramsey, Jr. et al. both assigned to the assignee of this invention.

The watthour meter 8 in one preferred embodiment is a type D4S single phase watthour meter manufactured and sold by the Meter Division of Westinghouse Electric Corporation, Raleigh, North Carolina. This watthour meter 8 includes a stator having a frame 12 supporting the bearing assembly 10 and a magnetic structure including a voltage section 13 and current section 14 illustrated diagrammatically in FIG. 1 and described in detail in U.S. Pat. No. 3,493,862 issued Feb. 3, 1970 to Ramsey, Jr. et al. and assigned to the assignee of this invention.

The voltage section 13 includes a voltage pole 13A formed by a center leg of an E-shaped magnetic core having outer legs 13C and 13B. A soft magnetic member 15 having a tongue 15A, which parts correspond to the parts designated 29 and 61, respectively, in the aforementioned U.S. Pat. No. 3,493,862, extends between the outer legs 13C and 13B. The tongue 15A extends horizontally into a disc air gap space 16 between the voltage and current sections 13 and 14. Current poles 14A and 14B of the current section 14 complete the main components of the magnetic structure. A voltage coil, not shown, on the voltage pole 13A and a current coil, not shown, associated with the current poles 14A and 14B direct alternating magnetic fluxes into an electroconductive disc 17 so that it is rotated in the disc gap 16 at a rate proportional to the consumption of electrical energy being measured by the meter 8 in a manner understood by those skilled in the art of watthour meters.

The disc 17 forms a part of the meter rotor which is carried on a vertical shaft 18 mounted for rotation about a vertical axis 19. The shaft 18 cooperates with an upper bearing assembly, not shown, and the magnetic bearing assembly 10 at the lower end thereof which assembly includes the improved temperature compensating feature made in accordance with this invention. The lower bearing assembly 10 is secured to the stator frame 12 by setscrew 20.

Figure 2:
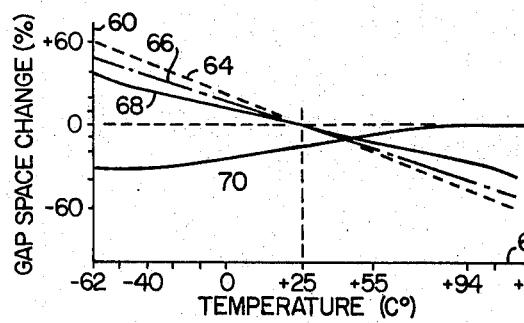
FIG. 2 is an enlarged fragmentray view of the magnetic bearing assembly illustrated in FIG. 1.
Figure 2:
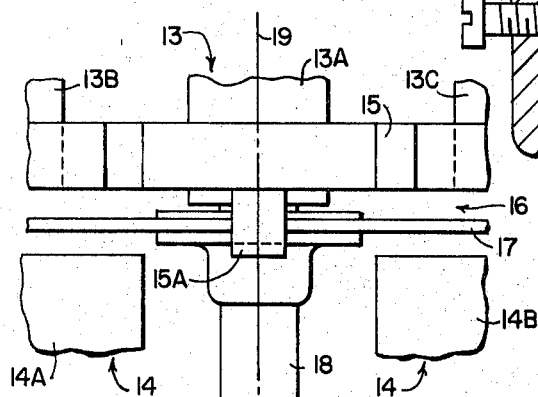

Referring now to FIG. 2, there is shown the magnetic bearing assembly 10 in an enlarged fragmentary view of FIG. 1. As described in the aforementioned U.S Pat. Nos. 3,143,704 and 3,309,152, a lower magnetic bearing assembly such as assembly 10 is operative to support the meter rotor including the shaft 18 and the associated rotor parts. The assembly 10 is made symmetrical about the vertical axis of rotation 19 of the rotor. A pin 22 is secured to a sleeve 23 which is preferably made of a non-magnetic material such as brass. The sleeve 23 is clamped in a cylindrical opening of the frame 12 by the screw 20. The end of the shaft 18 includes a ring bearing 24, described and claimed in U.S. Pat. No. 3,693,086, assigned to the assignee of this invention, which slidably reverses the pin 22.

The weight of the rotor is supported by interchanging magnetic fluxes of two hollow cylindrical permanent magnets 26 and 28 mounted concentric with the axis of rotation 19. The lower permanent magnet 26 is fixedly secured to the stator while the upper permanent magnet 28 is secured to the rotor. The permanent magnets are magnetized axially in such directions as to present like annular poles adjacent to each other. Accordingly, the annular pole face ends of the permanent magnets 26 and 28 are indicated as being magnetized, for purposes of this description, to provide an upper north pole and lower south pole in the permanent magnet 26 and a lower north pole and upper south pole in the upper permanent magnet 28. Interaction between the magnetic fluxes of the facing north poles develop a repulsion force which is sufficient to support the weight of the rotor. Accordingly, the only friction present in the rotatable support of the rotor is the friction between the pin 22 and ring bearing 24 and a corresponding pin and ring bearing in the upper bearing assembly as described in the aforementioned U.S. Pat. No. 3,693,086.

The permanent magnets 26 and 28 preferably are constructed of a material having a high coercive force. These materials include ceramic or ferrite permanent magnet materials such as those having a chemical formula of $MO6Fe_2O_3$ where M represents the material such as barium, lead or strontium. Fe represents iron and O represents oxygen. In a preferred embodiment of the invention, the barium containing material is employed and is represented by the chemical formula $BaO_6Fe_2O_3$. Such material may have a coercive force in the order of 1,600 oersteds and has been employed in a preferred embodiment.

As noted in the aforementioned U.S. Pat. No. 3,143,704, the parameters of the permanent magnet material depend upon the specific rotor to be supported, but the embodiment shown in FIG. 2 is stated as below for purposes of example and not limitation. The permanent magnets 53 and 55 have substantially identical dimensions and are constructed of a barium ferrite permanent magnet material having a coercive force in the order of 1,600 oersteds in the form of a ring or hollow cylinder so as to have annular pole face ends. The cylindrical dimensions are in one preferred embodiment as follows: an outer diameter of approximately 0.285 inch and inner diameter of 0.130 inch and a length of approximately 0.135 inch. The combined magnetic strengths of the two permanent magnets 26 and 28 are approximately 16 percent stronger than the corresponding permanent magnets and of the aforementioned U.S. Pat. No. 3,143,704 for purposes which will become apparent from the description hereinbelow.

The permanent magnets 26 and 28 are each mounted in soft magnetic cups 30 and 32 having the same general configurations as noted in the aforementioned U.S. Pat. No. 3,143,704. Accordingly, the cups 30 and 32 have a cylindrical wall in the exemplary preferred embodiment, with an inner diameter of approximately 0.324 inch and an outer diameter of approximately 0.345 inch, and are preferably made of a low carbon steel or cold rolled soft magnetic steel. The permanent magnet 26 is secured within the cup 30 so that its upper pole face end is substantially flush with the cup open end having an annular rim or lip 30A and rests on the cup bottom 30B. The thickness of the cup cylindrical wall is reduced by approximately 0.003 inch adjacent the lip 30A. The permanent magnet 26 is preferably secured by a solder 34 of a suitable composition. The cup 30 has a hollow conical base 30C concentric with the axis 19 and is press-fitted into a complementary recess provided in the sleeve 23.

The upper permanent magnet 28 is similarly secured within the soft magnetic cup 32 which is formed of a material similar to that employed in the cup 30. Solder 35 is employed for securing the permanent magnet 28 to the cup 32. The cup 32, in turn, is secured to the end of the shaft 20 in a suitable manner, such as being press-fitted within a cylindrical opening extending through the center of the cup 32 or die cast on the shaft end.

The top cup 32 has substantially the same dimensions as does the bottom cup 30 so as to define an annular rim or lip 32A substantially flush and coplanar with the bottom annular pole face end of the permanent magnet 28. The magnetic fluxes of the permanent magnets 26 and 28 interact so that the magnet 28 is magnetically repelled from the lower permanent magnet 26 by a bearing support gap 36 having a spacing 37 which is the distance parallel to the axis 18 between the facing permanent magnet pole face ends and in one preferred embodiment is designed to be maintained at a distance of approximately 0.020 inch at room temperature. The bearing support gap 36 is surrounded by an upper annular extending portion 23A of the sleeve 23 which is of a non-magnetic material to provide maximum physical protection circumscribing the support gap 36.

Because of the presence of each cup, the north poles of the permanent magnets are in effect surrounded by a concentric south pole face, cup lips 30A and 32A, with the two pole faces being coupled to each other through an efficient magnetic circuit. Each soft steel cup then constitutes a flux return path for the opposite pole faces of the associated permanent magnet and, further, materially increases the support effect of magnetic flux in the gap 36 by shaping in a predetermined configuration for the maximum lifting effect.

The cups 30 and 32 are constructed of a machinable material and are provided with accurate concentric outside diameters. This is desirable in order to minimize radial forces acting between the rotor and the stator. Furthermore, the provision of the cups facilitates the utilization of permanent magnets 26 and 28 which may have slight imperfections due to their brittle permanent magnet material construction. The cylindrical walls of the cups 30 and 32 further provide a major shielding for the permanent magnets and decrease the likelihood of interaction between the permanent magnet fields and the electromagnetic fields associated with the meter electromagnetic structure. The cups further materially reduce leakage from the permanent magnet pole faces and shape or concentrate the pole face flux in the gap 36 for maximum efficiency.

All the above, except for the slightly larger size of the permanent magnets 26 and 28, is set forth in the aforementioned U.S. Pat. Nos. 3,143,704 and 3,309,152. It is also noted in these patents, that the cups 30 and 32 materially reduce the effect of ambient temperature variations on the position of the rotor. As is shown, the material used in the permanent magnets 26 and 28 is subject to reversible decreases in magnetization as the ambient temperature increases. The cups 30 and 32 compensate for this change in magnetization or magnetic srength since they have a magnetic permeability which increases with temperature. The radial pole flux paths indicated by the numeral 40 for the permanent magnet 26 and the numeral 42 for the permanent magnet 28, extend from the facing north pole faces into the gap 36 and return through the hollow cylindrical sides of the cups 30 and 32 to the opposite south pole faces. Accordingly, the cups 30 and 32 each define a series magnetic flux path for the pole fluxes of the associated permanent magnets which interact in the gap 36 to provide the vertical support of the rotor. In the bearing assembly disclosed in U.S. Pat. No. 3,143,704 disc movement due to temperature variation in a range of −40° to 45° C was controlled to about 0.010 inch or an average of 0.0014 inch/° C which under previously desired limits of disc movement was acceptable.

In order to improve allowable disc movement over extended and elevated temperature ranges a temperature compensating sleeve 50, forming an important feature of this invention, is made of a magnetic material having a negative temperature coefficient of permeability, such as provided by a nickel-steel alloy having a 31 percent nickel content and is positioned along the inner diameter of the lower permanent magnet 26. The sleeve 50 extends axially between the opposite pole face ends of the lower permanent magnet 26 as described further hereinbelow.

Figure 3A:
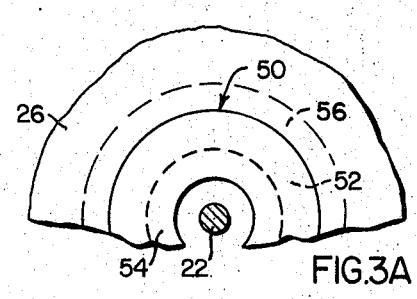
FIGS. 3A and 3B are cross-sectional views of FIG. 2 taken along axes IIIa and IIIB, respectively and looking in the direction of the arrows.
Figure 3B:
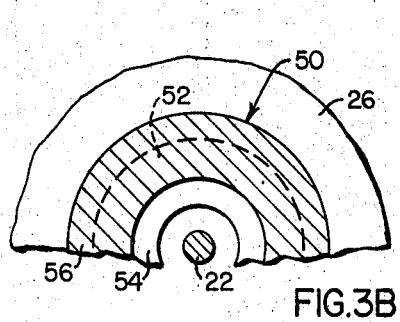

The compensating sleeve 50 has a thin-walled cylindrical body 52 terminated by a radially outward extending circular flange 54 at the upper end, an end view of the flange 54 being shown in FIG. 3A, and a radially outward extending circular flange 56 at the lower end, of which an end view if shown in FIG. 3B. The upper side of the flange end 54 is substantially flush or coplanar with the upper north pole face end of the permanent magnet 26. The inner side of the lower flange end 56 overlaps the opposite south pole face end of the permanent magnet 26. The lower flange end 56 is conveniently supported in a nested relationship within a counterbored annular shoulder 58 formed in the bottom portion of the cup 30 around the opening thereof receiving the pin 22. The upper and lower flange ends 54 and 56 of the sleeve 50 provide expanded pole face areas for more efficiently shunting the permanent magnet pole flux through a shunt path partially indicated by the lines designated 60 in the support gap 36. It has been found that if the cylindrical body 52 of the sleeve 50 does not include the flanged ends 54 and 56, the cross-sectional thickness of the sleeve body must be made somewhat thicker to have the same shunting effect as provided by a thinner body wall with the flanged ends 54 and 56. This was found undesirable in increased cost of the sleeve material and limiting the size of the lower permanent magnet 26. Further, it can be seen in FIGS. 1 and 2 that the sleeve 50 provides a compact arrangement without substantially altering the magnetic bearing structure shown in the aforementioned Pat. Nos. 3,143,704 and 3,309,152. Also positioning a compensating sleeve around the outer diameter of magnet 26 was found substantially less efficient. The body 52 of the sleeve 50 in the exemplary preferred embodiment of the magnetic bearing assembly 10, described hereinabove includes a length excluding the flange ends 54 and 56 of approximately 0.17 inch and the outer diameter of the sleeve body is approximately 0.12 inch and has a thickness of approximately 0.020 inch. Accordingly, the total length of the sleeve 50 is approximately 0.157 inch and the internal diameter is approximately 0.080 inch.

The magnetic bearing assembly 10 including the temperature compensating sleeve 50 substantially reduces the variation of the bearing support gap spacing 37 and, accordingly, the disc movement in the disc air gap space 36 over an extended elevated temperature range of between −62° to 121° C. This is of particular advantage in high efficiency watthour meters of the type having the magnetic structure shown in FIG. 1. In these meters it is desirable to maintain a minimum disc air gap 16 so that the fluxes from the voltage pole 13A and current poles 14A and 14B have the shortest paths to the disc 17 while utilizing a minimum of materials especially in the meter magnetic structure. In FIG. 1, the limits of the disc movement is determined by the end of the voltage pole 13A above the disc 17 and the tongue 15A below the disc. Since the permanent magnets 26 and 28 lose magnetic strength at elevated temperatures, it has been observed that the disc may have a tendency to rub against the tongue when utilizing the magnetic bearing assembly disclosed in the aforementioned U.S. Pat. Nos. 3,143,704 and 3,309,152 in the meter 8 at temperatures in the order 94° C. This is more clearly understood in connection with the description of the operation and the graph curves of FIG. 4.

In operation, at room temperatures in the order of 25° C, the shunt flux path indicated by the lines 60 is diverted from the north pole end of the permanent magnet 26 and returned through the body 52 of the compensating sleeve 50 to the opposite south pole end. This has the effect of decreasing the magnetization of the pole face flux interacting with the pole flux of the upper permanent magnet 28. It further causes a reorientation or distortion of the lower permanent magnet pole flux 40 which interacts with the upper permanent magnet pole flux 42 so as to decrease the supporting effectiveness of the flux interaction in the gap. Due to the negative temperature coefficient of permeability of the compensating sleeve 50, as temperature rises above room temperature, less of the pole flux flows through the shunt path 60 so more flows through the supporting path 40 which is thereby also reoriented into more effective interacting relationship with the upper pole flux path 42. Concurrently, the positive temperature coefficient of permeability of the soft steel cups 30 and 32 cooperatively with the opposite change in permeability of the sleeve 50 and decreased magnetic strength of the permanent magnets 26 and 28 reduce their reluctance in the return path of the pole face fluxes. This reduces the tendency for the disc 17 to drop.

Conversely, as the ambient temperature decreases below room temperature the increase of magnetic strength of the permanent magnets is counteracted by more pole flux from the path 40 being shunted through the sleeve 50. This also further shapes the lower magnetic pole face flux decreasing the supporting effectiveness thereof. The soft steel cups also cooperatively increase permeability to reduce the tendency of the disc 17 to rise in the disc air gap 16.

The ordinate axis 60 of the graph indicates plus or minus percentage change in the support gap spacing 37 in the meter 8 from a reference spacing designated "0" at room temperature (25° C). The abscissa axis 62 indicates ambient temperatures from −62° to +121° C. The dashed line of curve 64 indicates the gap spacing 37 changes for a bearing assembly having the permanent magnets 26 and 28 without the soft steel magnetic cups 30 and 32 or the compensating sleeve 50. The dash-dot line of curve 66 indicates the gap spacing 37 for a bearing prior art assembly having the permanent magnets 26 and 28 and the soft steel magnet cups 30 and 32 and without the sleeve 50. The solid line of curve 68 indicates the gap spacing 37 changes for the bearing assembly 10 made in accordance with this invention. The heavy solid line of curve 70 illustrates the effect of the pole flux shunted through the compensating sleeve 50 throughout the operating temperature range.

The curve 70 indicates that as the temperature increases from the low temperature of −62° C there is less of the pole flux of the lower permanent magnet 26 shunted through the compensating sleeve 50. As the temperature reaches approximately 80° C the compensating sleeve has only a slight effect on the supporting interacting fluxes of the permanent magnets 26 and 28.

The curve 66 shows the variation for the bearing assembly substantially as described in the U.S. Pat. Nos. 3,143,704 and 3,309,152 when used in the meter 8 and has an average decrease in the gap spacing 37 of 0.00014 inch/° C which provided approximately 0.010 inch drop from 25° to 94° C. However, the curve 68 shows that the bearing assembly 10 provides an average decrease in the gap spacing 37 of 0.00007 inch/° C which provided a drop of approximately 0.005 inch from 25° to 94° C. Accordingly, an improved limited disc movement of approximately 50 percent is provided by the present invention. This permits improved reliability of watthour meters operating in more extended ambient temperature extremes for operation of watthour meters exposed to widely varying outside weather conditions.

While the embodiment of the magnetic bearing assembly 10 described hereinabove constitutes a preferred form, it is to be understood that other embodiments may be made without departing from the spirit and scope of the invention.

We claim:

1. An induction meter including a stator member, a rotor member, and a magnetic bearing assembly for supporting the rotor member for rotation about a vertical axis, wherein said bearing assembly comprises:

upper and lower soft magnetic cup members having a given temperature coefficient of permeability carried in facing concentric alignment by said rotor and stator members, said cup members including lip portions at the open ends defining pole faces in spaced opposing relationship;

upper and lower permanent magnets each having opposite annular pole face ends and carried within said cup members with one pole face end of each magnet positioned radially adjacent a cup lip portion and in concentric alignment with the pole face end of the other magnet, a substantial portion of the magnetic fluxes of each of the mutually facing one pole face ends passing radially outward of the pole face ends and through said adjacent cup lip portions so as to be mutually interacting to support said upper permanent magnet at a predetermined support spacing from said lower permanent magnet, and said cup members each defining a series temperature compensating magnetic flux path for returning said interacting magnetic fluxes to the opposite pole face ends of said permanent magnets; and a temperature compensating magnetic sleeve extending between the pole face ends of one of said permanent magnets along the inner diameter thereof and having a temperature coefficient of permeability, opposite from the given temperature coefficient of permeability, said magnetic sleeve defining a shunt temperature compensating magnetic flux path for passing radially inwardly a remaining portion of the one pole face magnetic flux of said one permanent magnet, and said remaining flux portion in said shunt magnetic path and said substantial flux portion in said series magnetic path cooperatively varying in inverse relationships to maintain said predetermined support spacing with changes in temperature.

2. An induction meter as claimed in claim 1, wherein said one permanent magnet includes the lower permanent magnet and said sleeve terminates in end portions extending substantially in a coplanar relationship with the opposite pole face ends of said lower permanent magnet.

3. An induction meter as claimed in claim 2, wherein said temperature compensating magnetic sleeve includes radially extending end portions extending from a cylindrical body portion so as to provide an expanded pole face area mutually coacting with the opposite pole face ends of said lower permanent magnet.

4. An inducation meter as claimed in claim 3, wherein the soft magnetic material forming said cup members includes a positive temperature coefficient of permeability, and wherein said temperature compensating magnetic sleeve is formed of a material having a negative temperature coefficient of permeability.

5. An induction meter as claimed in claim 4, wherein said temperature compensating magnetic sleeve includes a radial inwardly extending upper flange end and a radial outwardly extending lower flange end, and further wherein said lower cup member has a counterbored mounting portion for receiving said lower flange end of said magnetic sleeve and supporting the lower flange end in overlapping engagement with lower pole face end of said lower permanent magnet.

* * * * *